Feb. 4, 1941.    R. B. LOHRY    2,230,756
AUTOMOBILE WINDOW OPERATING MECHANISM
Filed Aug. 19, 1939    2 Sheets-Sheet 1
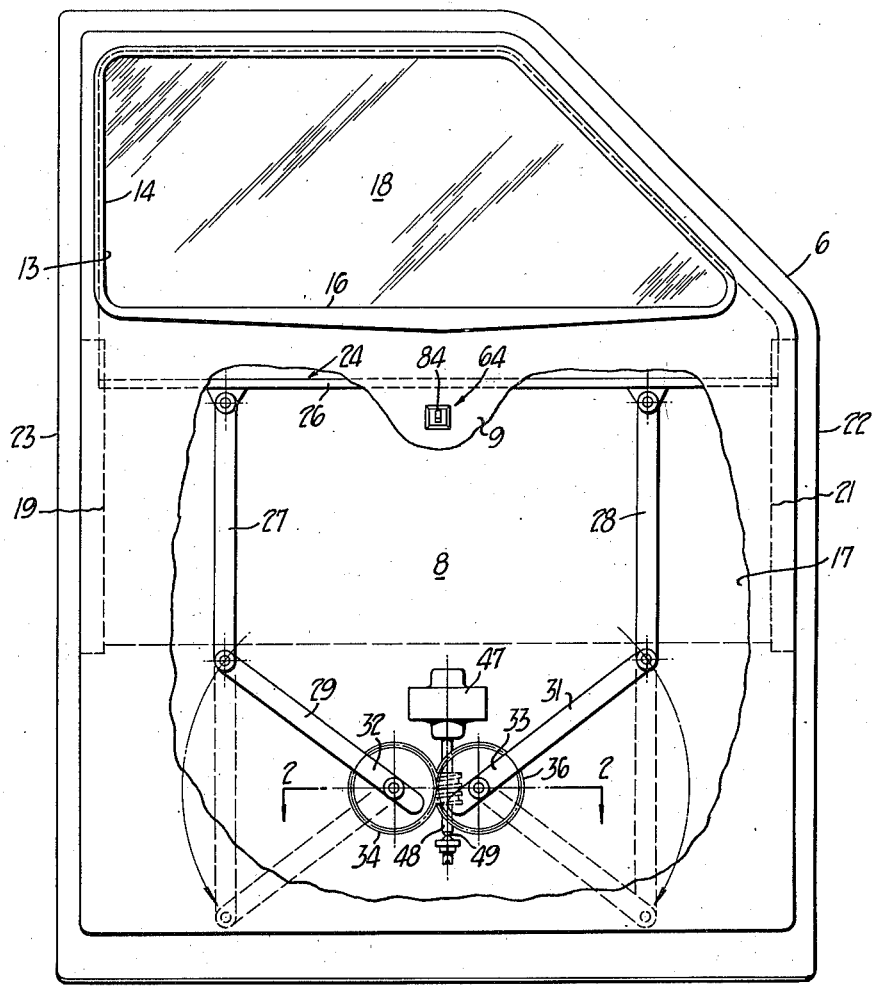
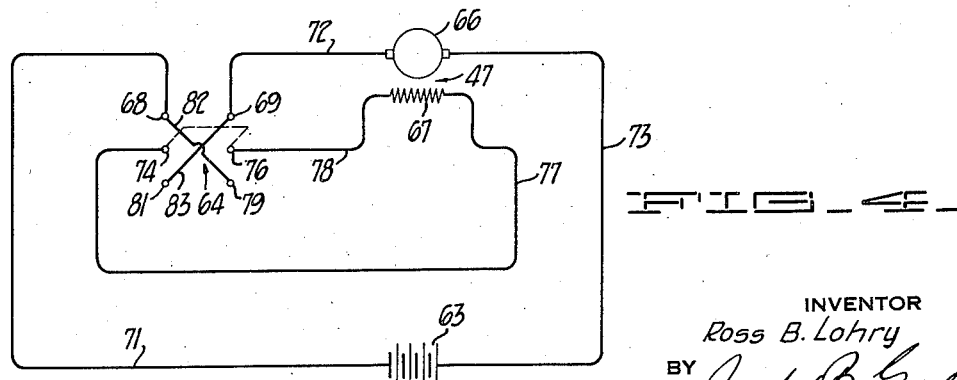
INVENTOR
Ross B. Lohry
BY
Joseph B. Gardner
ATTORNEY Feb. 4, 1941.   R. B. LOHRY   2,230,756
AUTOMOBILE WINDOW OPERATING MECHANISM
Filed Aug. 19, 1939   2 Sheets-Sheet 2

INVENTOR
Ross B. Lohry
BY *Joseph B. Gaudry*
ATTORNEY

Patented Feb. 4, 1941

2,230,756

UNITED STATES PATENT OFFICE 2,230,756

AUTOMOBILE WINDOW OPERATING MECHANISM

Ross B. Lohry, Oakland, Calif.

Application August 19, 1939, Serial No. 291,023

3 Claims. (Cl. 268—124)

The invention relates to operating mechanisms for automobile door windows and more particularly to such mechanisms as are power operated.

As will be understood, the normal operation of raising and lowering the window pane in a car door by means of the customary crank mechanism is somewhat slow and tedious as well as inconvenient during the driving of the automobile. On the other hand it is frequently desired, especially during cold weather, to keep the car windows substantially closed and yet the window adjacent the driver's seat must be frequently lowered to permit arm signaling. The inability of many drivers to rapidly lower the door window during the operation of the car without substantial interference with the driving of the vehicle has been the source of many automobile accidents and cautious drivers will many times leave the door window open even during cold weather in order to gain free access through the opening for signaling. To solve this problem it has been suggested that the raising and lowering of the window pane be effected by a power-driven mechanism, whereby the pane may be rapidly raised or lowered as the occasion may require with a minimum amount of effort, or disturbance of the driver. It has been proposed to drive the window moving structure with an electric motor so that the raising and lowering of the window may be accomplished by the simple expedient of throwing an electric switch. The end points of movement of the window pane in such structure have been controlled by mounting of circuit breaking switches at the top and bottom positions of the pane or its moving mechanism, whereby the motor circuit will be automatically opened upon movement of the pane to a fully opened or closed position. Such structures, however, have certain inherent defects. The window pane is customarily seated and sealed in a surrounding casing of rubber or other elastic material and it is essential that the pane be firmly seated in such casing in order to obtain a reasonably good seal. The mounting of electric switches in the top of the rubber casing frame not only breaks the continuity of the seal at the position of the switch but causes the opening of the electric circuit before the pane has become firmly seated. Also, the auxiliary electric switches used with such an arrangement are subject to getting out of order and rendering the mechanism inoperative. In addition such power-operated window mechanisms positively drive the window pane from open to closed position and vice-versa, and there is a constant danger of the operator catching his arm or hand in the window space during operation of the device.

The present window operating mechanism has been designed to completely obviate all of the above enumerated disadvantages while retaining all of the many advantages of a power-operated window mechanism. In the present mechanism the window is positively driven from open to closed position and vice-versa and is firmly seated in its sealing frame in the door, but during such movement the window pane will automatically stop upon presenting of an obstruction to its movement, such as occasioned by the striking of the arm or hand of the driver or user.

Another object of the present invention is to provide a window operating mechanism of the character described which will be simple and sturdy in construction and provide a positively operating mechanism for a substantially unlimited life.

A further object of the invention is to provide a window operating mechanism of the character above which may be readily embodied in an automobile door of the present construction and which will be simply and compactly arranged on the door.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of an automobile door with a portion of the door casing broken away to show the present invention.

Figure 4 is a schematic wiring diagram of the electric circuit for the present mechanism.

The automobile window operating mechanism of the present invention consists briefly of the combination with an automobile door having a window opening and a window pane movably carried by the door for movement to and from a closed position in the opening, an electric motor and switch and circuit means therefor, and a driving mechanism connecting the motor and the pane and including as part thereof slip-drive connection means operable to transmit a limited amount of torque for moving the pane against a nominal resistance and permitting a relative movement of the motor and a stopping of the pane upon the latter incurring a greater resistance to its movement.

Figure 2:
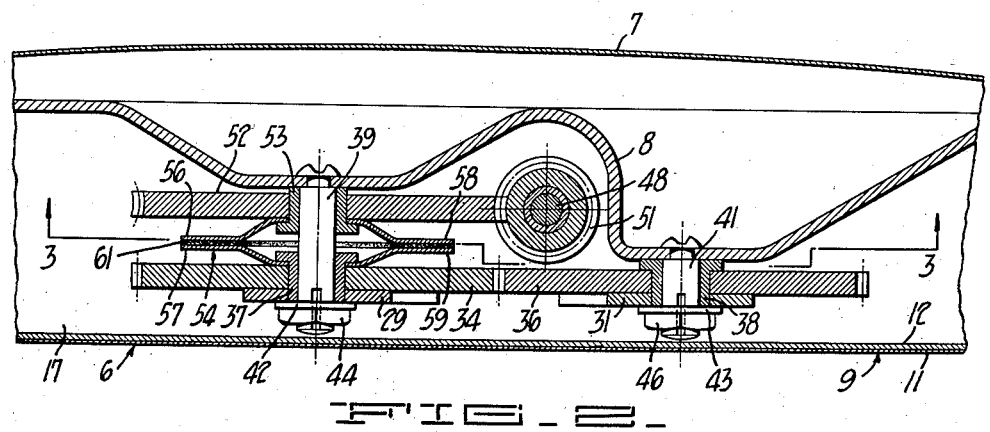
Figure 2 is a cross-sectional view of the door and is taken substantially on the plane of line 2—2 of Figure 1.

With reference more particularly to the accompanying drawings, the automobile window operating mechanism therein depicted is shown operatively arranged upon an automobile door 6 of more or less standard construction having an outside wall or panel 7, a transverse reenforcing plate or bar member 8, and an interior wall 9 composed of an outer layer of upholstery material 11 and an inner backing wall 12. The door is provided with a window opening 13 defined in a surrounding frame 14 in which may be seated a suitable rubber or fabric gasket for sealing of the pane and which is communicated at the lower end 16 of the frame with the interior compartment 17 of the door defined between the reenforcing plate 8 and the inner wall 9. A window pane 18, which is appropriately cut or formed to fit the frame 14, is slidably mounted for vertical reciprocation on a pair of vertical guides 19 and 21 at the fore and rear ends 22 and 23 of the door. Secured across the lower edge 24 of the pane is a fastening member 26 to which in turn are pivoted a pair of links 27 and 28 which depend from the member 26 into the lower compartment 17. These links are in turn connected at their lower ends to crank arms 29 and 31, which are fixed at their opposite ends 32 and 33 for rotation with a pair of enmeshed gears 34 and 36, whereby upon appropriate rotation of the gears, the window pane may be raised or lowered. As will be best seen from Figure 2, the gears 34 and 36 as well as the crank arms 29 and 31, are mounted upon bearing sleeves 37 and 38 fixedly mounted for rotation upon studs 39 and 41 fastened to the backing plate 8 and extending forwardly therefrom towards the inner wall 9. Preferably, the gears and crank arms are keyed to their respective sleeves. The sleeves 37 and 38 are preferably held in position upon the stud shafts 39 and 41 by means of washers 42 and 43 keyed for longitudinal movement on the shafts 39 and 41, and nuts 44 and 46 threaded on the ends of the shafts.

Mounted on the inner side of the plate 8 above the gears 34 and 36 is an electric motor 47 arranged with the drive shaft 48 thereof vertical and extending down behind the gears 34 and 36 and supported at its lower end on a thrust bearing 49 mounted on the plate. A worm-gear 51 is mounted on shaft 48 and positioned to enmesh with a gear 52 rotatably carried on shaft 39 between the gear 34 and the plate 8. Preferably the worm-gear is of a double-thread type as here illustrated, in order to obtain a greater thread pitch and a greater speed transmission therethrough. The gear 52 is preferably mounted on a bearing sleeve 53 in the same manner as the gears 34 and 36.

Figure 3:
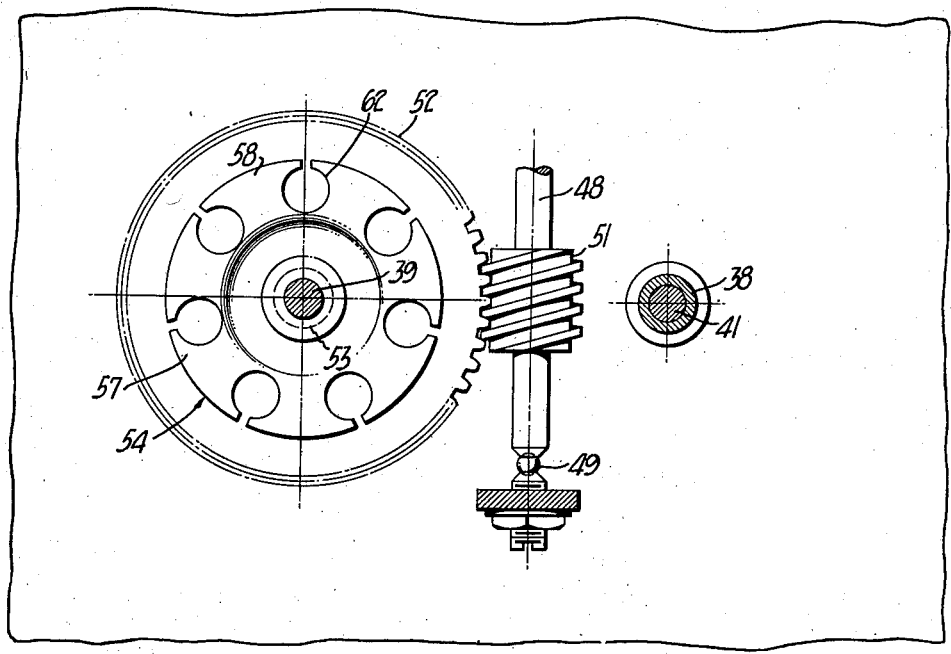
Figure 3 is a fragmentary vertical sectional view of the operating mechanism taken substantially on the plane of line 3—3 of Figure 2.

In the present mechanism the driving force of the motor is transmitted from the gear 52 to the gear 34 through a slip drive connection mechanism 54 which is operative to transmit a limited amount of torque from gear 52 to gear 34 and to permit movement of the gear 54 relative to gear 34 upon meeting a resistance to movement greater than that for which the apparatus is adjusted. The mechanism in the present instance consists of a pair of clutch plates 56 and 57 mounted coaxially about the shaft 39 and secured respectively to gears 52 and 34 for rotation therewith and being resiliently engaged so as to transmit a limited amount of torque from gear 52 to gear 34 and to slip one against the other upon stopping of movement of gear 34 and continued movement of the motor. As will be seen in Figure 2, these plates are substantially dish-shaped and formed with parallel peripheral portions 58 and 59 which are resiliently held in engagement with each other. Preferably a layer 61 of clutch friction material is secured to the peripheral portion 59 for engagement with the peripheral portion 58 and the latter portion is provided with a plurality of circumferentially spaced openings 62, see Figure 3, for permitting the same to flex relative to the peripheral portion 59. The resilient engagement of the plates may be controlled and adjusted by tightening or loosening of nut 44 on the shaft so as to bring the plates closely together or to space the same further apart. In accordance with this construction the plate 57 will be normally caused to rotate with plate 56 so as to cause a raising or lowering of the window pane, depending upon the direction of rotation of the plate 56. As soon as the pane reaches the top of the window frame or the bottom thereof or is otherwise obstructed in its movement so as to stop or slow down the movement of gear 34, the plate 56 may slide on plate 57 so that the motor may continue to operate without over-straining any of the connecting parts. Thus the mechanism is capable of raising the window pane into a firmly pressed closed position in its sealing gasket and the mechanism may be left in operation after a full closing of the window. Similarly upon movement of the pane to its lowermost position, the motor may continue to operate momentarily until the operator opens the electric circuit without any danger of straining any of the operating parts. Also, should the operator accidentally have his arm positioned in the window frame at the time of closing of the electric circuit to raise the window pane, the pane will automatically stop upon raising and pressing against the arm without any danger of pinching or crowding of the arm in the window frame.

The motor used in the present mechanism is a reversible type capable of reversing its direction of rotation upon reversing the flow of electric current therethrough. The electric circuit for the motor is illustrated in Figure 4 and includes a battery 63, a reversing switch 64, an armature 66 and the field winding 67 of the motor 47. The reversing switch 64 is of a double-pole, double-throw type and has the end contacts 68 and 69 connected to one side of the battery and to one side of the armature by means of conductors 71 and 72. The opposite side of the armature is connected by conductor 73 to the opposite side of the battery. The opposite ends of the field winding 67 are connected to the center contacts 74 and 76 by means of conductors 77 and 78, and the end contacts 68 and 69 are connected to the opposite end contacts 79 and 81 by reversing leads 82 and 83. The switch 64 is preferably of a toggle type and may be mounted directly on the inner wall of the door as illustrated in Figure 1, whereby the operating mechanism for the door window, with the exception of certain of the electric leads, is completely contained on the door. The toggle switch 64 is preferably mounted so that upon raising of the switch actuating member 84, the motor will be rotated in a direction to raise the window pane and upon lowering of the switch member 84 the motor will be rotated in an opposite direction to lower the window pane.

I claim:

1. In combination with an automobile door having a window opening and a window pane slidably carried by the door for vertical movement into and across said opening, an electric motor carried by said door, a shaft carried by said door, a gear rotatably carried on said shaft, a worm-gear driven by said motor and enmeshed with said first gear, a second gear mounted for rotation on said shaft, means actuated by said second gear for raising and lowering said window, a friction disk rotatably mounted on said shaft, and a pair of resilient members carried by said first and second gears respectively and having frictional engagement with said disk at opposite sides thereof for transmitting a limited torque from said first gear to said second gear.

2. In combination with an automobile door having a window opening and a window pane slidably carried by the door for vertical movement into and across said opening, an electric motor carried by said door, a stud shaft carried by said door horizontally across the thinness of the door, a pair of gears rotatably mounted on said stud shaft and spaced from each other, a worm-gear driven by said motor and enmeshed with one of said gears, means connecting the other of said gears and adapted to raise and lower said window upon rotation of the gear, and resilient plates carried by each of said gears for rotation therewith and resiliently engaged for transmission of a limited amount of torque between said gears.

3. In combination with an automobile door having inner and outer walls and a window opening and a window pane slidably carried by the door for vertical movement into and across said opening, a transverse reinforcing plate extending substantially coplanar with said door and in spaced relation between said inner and outer walls thereof, an electric motor mounted on said plate, a stud shaft carried by said plate horizontally across the transverse dimension between said plate and inner door wall, a pair of gears rotatably mounted on said stud shaft and spaced from each other, a worm-gear driven by said motor and enmeshed with one of said gears, means connecting the other of said gears and adapted to raise and lower said window upon rotation of the gear, and resilient plates carried by each of said gears for rotation therewith and resiliently engaged for transmission of a limited amount of torque between said gears.

ROSS B. LOHRY.